(12) United States Patent
Dominizi et al.

(10) Patent No.: US 10,128,962 B2
(45) Date of Patent: Nov. 13, 2018

(54) RF FRONT-END WITH POWER SENSOR CALIBRATION

(71) Applicant: Infineon Technologies AG, Neubiberg (DE)

(72) Inventors: Karl Dominizi, Altenberg bei Linz (AT); Oliver Frank, Linz (AT); Herbert Jaeger, Linz (AT); Herbert Knapp, Munich (DE); Hao Li, Poing (DE); Florian Starzer, Ennsdorf bei Enns (AT); Rainer Stuhlberger, Punchenau (DE); Jonas Wursthorn, Sankt Johann-Würtingen (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/145,485

(22) Filed: May 3, 2016

(65) Prior Publication Data

US 2016/0329972 A1    Nov. 10, 2016

(30) Foreign Application Priority Data

May 4, 2015  (DE) .................. 10 2015 106 931

(51) Int. Cl.
*H04B 17/00* (2015.01)
*H04B 17/21* (2015.01)
*H04B 17/11* (2015.01)
*H04B 17/18* (2015.01)
*H04B 17/10* (2015.01)

(52) U.S. Cl.
CPC ......... *H04B 17/0085* (2013.01); *H04B 17/11* (2015.01); *H04B 17/18* (2015.01); *H04B 17/21* (2015.01); *H04B 17/102* (2015.01)

(58) Field of Classification Search
CPC .. H04B 17/0085; H04B 17/102; H04B 17/11; H04B 17/18; H04B 17/21
USPC ........................................ 455/67.14
See application file for complete search history.

(56) References Cited

U.S. PATENT DOCUMENTS

| 5,204,614 | A | 4/1993 | Szente et al. |
| 5,594,358 | A * | 1/1997 | Ishikawa ............ G01R 1/06772 324/754.31 |
| 6,748,203 | B1 | 6/2004 | Brankovic et al. |
| 7,516,428 | B2 | 4/2009 | Fulga et al. |

FOREIGN PATENT DOCUMENTS

| CN | 2591637 | 12/2003 |
| CN | 1519566 | 7/2004 |
| CN | 102299752 | 5/2009 |

* cited by examiner

*Primary Examiner* — Eugene Yun
(74) *Attorney, Agent, or Firm* — Harrity & Harrity, LLP

(57) ABSTRACT

One exemplary embodiment of the present invention relates to a circuit that includes at least one RF signal path for an RF signal and at least one power sensor, which is coupled to the RF signal path and configured to generate a sensor signal representing the power of the RF signal during normal operation of the circuit. The circuit further includes a circuit node for receiving an RF test signal during calibration operation of the circuit. The circuit node is coupled to the at least one power sensor, so that the at least one power sensor receives the RF test signal additionally or alternatively to the RF signal and generates the sensor signal as representing the power of the RF test signal.

12 Claims, 3 Drawing Sheets

RF FRONT-END WITH POWER SENSOR CALIBRATION

RELATED APPLICATION

This application claims priority under 35 U.S.C. § 119 to German Patent Application No. 102015106931.8, filed on May 4, 2015, the content of which is incorporated by reference herein in its entirety.

TECHNICAL FIELD

Embodiments of the present invention relate to the field of RF receivers and transmitters. In particular to an RF front-end which may be used, for example in integrated radar transceivers.

BACKGROUND

Radio frequency (RF) transmitters and receivers can be found in numerous applications, particularly in the field of wireless communications and radar sensors. In the automotive sector, there is an increasing demand for radar sensors used in so-called "adaptive cruise control" (ACC) or "radar cruise control" systems. Such systems may be used to automatically adjust the speed of an automobile so as to maintain a safe distance from other automobiles (and from other objects as well as from pedestrians) ahead.

Modern radar systems make use of highly integrated RF circuits, which may incorporate all core functions of an RF front-end of a radar transceiver in one single package (single chip radar transceiver), which is often referred to as MMIC (monolithic microwave integrated circuit). Such RF front-ends usually include, inter alia, a voltage controlled oscillator (VCO), power amplifiers (PA), directional couplers, mixers, and analog-to-digital converters (ADC), as well as respective control circuitry for controlling and monitoring of the RF front-end. Radar applications used in automobiles are subject to various standards concerning road traffic safety, for example the functional safety standard ISO 26262 titled "Road vehicles—Functional safety". To ensure the functional safety of a radar sensor and/or to comply with statutory regulations, the RF front-end should operate with well-defined operation parameters.

For example, the RF front-end should provide an RF output signal (e.g. the transmit signal to be supplied to one or more antennas) with a defined output power in order to achieve a desired sensor performance. Furthermore, a maximum output power should not be exceeded during operation of the RF front-end in order to comply with statutory regulations. Moreover, the output power of the transmit signal should also not be lower than a minimum output power in order to ensure a reliable operation of the radar sensor. To comply with functional safety standards the MMIC should have the ability to detect malfunctions of the radar sensor, for example, when the RF output power is not within specified limits. Thus, there is a need to measure the power in an RF signal path in the RF front-end. However, available power sensing circuits (power sensors) have a poor accuracy and thus comparably broad guard bands are currently taken into account in the design of RF front-ends and during production tests in order to ensure to not leave the desired range of operation. Broad guard bands result in a correspondingly high number of deficient products and respective yield loss. Therefore, there is a need to improve accuracy of power sensing in integrated RF front-ends.

SUMMARY

One exemplary embodiment of the present invention relates to a circuit that includes at least one RF signal path for an RF signal and at least one power sensor, which is coupled to the RF signal path and configured to generate a sensor signal representing the power of the RF signal during normal operation of the circuit. The circuit further includes a circuit node for receiving an RF test signal during calibration operation of the circuit. The circuit node is coupled to the at least one power sensor, so that the at least one power sensor receives the RF test signal additionally or alternatively to the RF signal and generates the sensor signal as representing the power of the RF test signal.

Another exemplary embodiment relates to a system comprising a MMIC and an automatic testing equipment (ATE). The MMIC includes at least one RF signal path for an RF signal, at least one power sensor coupled to the RF signal path, and a circuit node for receiving an RF test signal. The power sensor is configured to receive the test signal and to provide a sensor signal representing the power of the test signal. The ATE is configured to generate the RF test signal and feed the RF test signal into the circuit node.

Moreover, a further exemplary embodiment relates to a method for calibrating one or more power sensors included in a MMIC. The method includes generating a RF test signal, which has a desired power. The RF test signal is fed to a circuit node, which is coupled to at least one power sensor included in the MMIC. Thus, the power sensor provides a respective sensor signal that represents the power of the RF test signal. Moreover, the method includes calculating at least one calibration parameter based on the desired power and the respective sensor signal and storing the calibration parameter(s) in a memory.

BRIEF DESCRIPTION OF THE DRAWINGS

The invention can be better understood with reference to the following description and drawings. The components in the figures are not necessarily to scale, emphasis instead being placed upon illustrating the principles of the invention. Moreover, in the figures, like reference numerals designate corresponding parts. In the drawings.

DETAILED DESCRIPTION

Embodiments of the present invention are discussed below in the context of a radar transceiver (radar sensor). It should be noted, however, that the present invention may also be applied in applications different from radar such as, for example, RF transceivers of RF communication devices.

Figure 1:
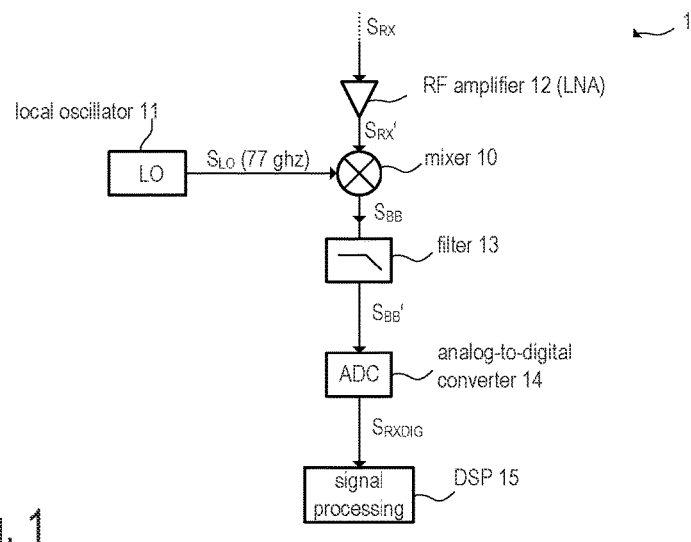
FIG. 1 shows a block diagram illustrating the basic structure of the receive path of an RF transceiver chip.

A so-called "single chip radar" may include circuitry providing the core functions needed for distance and/or velocity measurement in one chip (monolithic microwave integrated circuit, MMIC). Thus the chip may include, inter alia, RF oscillators, amplifiers, mixers, filters, analog-to-digital converters, and digital signal processors. FIG. 1 illustrates an RF receiver (or the receive path of an RF transceiver) as used, for example, in a radar distance measurement device (radar sensor). Accordingly, the RF transceiver/receiver 1 includes a mixer 10 which is supplied with an RF input signal $S_{RX}$ and an RF oscillator signal $S_{LO}$, used to down-convert the RF input signal $S_{RX}$ into the base band or an intermediate frequency (IF) band. The RF input signal $S_{RX}$ may be provided by an antenna (not shown in FIG. 1) and may be pre-amplified (see RF amplifier 12) before being supplied to the mixer 10. In the present example, the RF oscillator signal $S_{LO}$ is generated by a local oscillator (LO) 11, which may include a voltage controlled oscillator ($V_{CO}$) coupled in a phase locked loop (PLL). However, the RF oscillator signal $S_{LO}$ may be provided by other circuitry dependent on the actual application. In radar applications the local oscillator signal $S_{LO}$ is usually frequency modulated to implement a so-called frequency modulated continuous wave (FMCW) radar sensor. When used in a radar distance measurement device, the RF oscillator signal $S_{LO}$ may be in the range between approximately 24 GHz and 77 GHz (77 GHz in the present example). However, higher or lower frequencies may also be applicable.

As mentioned, the mixer 10 down-converts the RF input signal $S_{RX}'$ (amplified antenna signal) into the base band (or IF band). The respective base band signal (mixer output signal) is denoted by $S_{BB}$. The base band signal $S_{BB}$ is then subject to analog filtering (filter 13) to suppress undesired sidebands or image frequencies. The filter 13 may be a low-pass filter or a band-pass filter. The filtered base band signal (filter output signal) is denoted by $S_{BB}'$. Receivers which make use of a mixer to down-convert the RF input signal into the base band or an IF band are as such known as heterodyne receivers and thus not further discussed in more detail. The filtered base band signal $S_{BB}'$ is then sampled and converted to a digital signal $S_{RXDIG}$ (analog-to-digital converter 14), which is then further processed in the digital domain using a digital signal processing (accomplished, e.g., by digital signal processor 15). In case of a down-conversion into an IF band, the IF signal may also be digitized for a digital de-modulation of the IF signal. The digital signal processing may be performed using, e.g., a digital signal processor executing appropriate software instructions.

Figure 2:
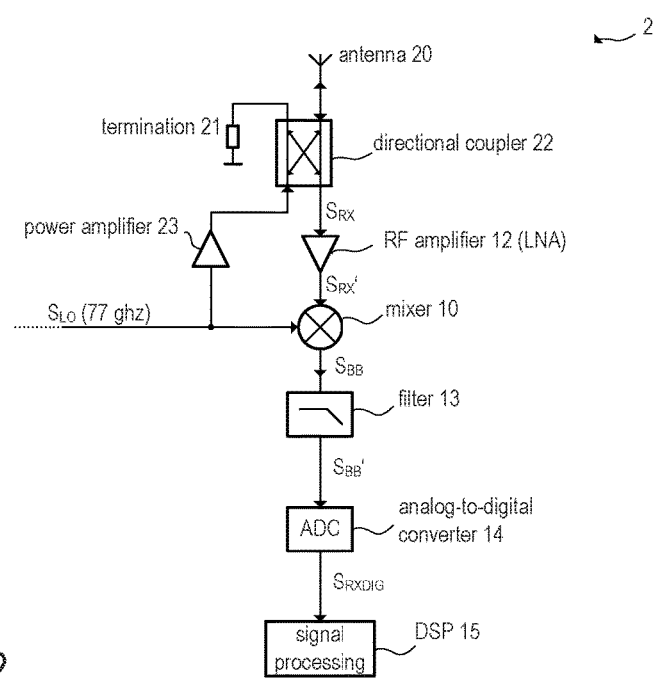
FIG. 2 is a block diagram illustrating the receive/transmit path in a monostatic radar transceiver chip.

FIG. 1 illustrates the receive path of an RF receiver or transceiver. In so-called bistatic or pseudo-monostatic radar systems the receiver may be separate from the transmitter as receiver and transmitter use separate antennas. FIG. 2 illustrates a RF transceiver (combined receiver and transmitter), which may be used in a monostatic radar system, in which the same antenna is used to transmit and receive RF signals. The transceiver of FIG. 2 includes a directional coupler 22, which is coupled between the mixer 10 and an antenna 20 and configured to direct the RF signal $S_{RX}$, received by the antenna 20 to the mixer 10 (receive path). Moreover, the directional coupler 22 is configured to direct the RF oscillator signal $S_{LO}$ (amplified by power amplifier 23) to the antenna 20, which transmits a respective electromagnetic radar signal. Besides the directional coupler 22, the receive path (amplifier 12, mixer 10, filter 13, analog-to-digital converter 14, signal processor 15) is the same as in FIG. 1 and the respective description is thus not repeated here.

The directional coupler 22 may be implemented as rat-race coupler formed by strip lines. However, other types of directional couplers (e.g. circulators) may be used. Particularly, when using a rat race coupler, one port of the coupler is terminated by a termination impedance 21. The directional coupler 22 may be implemented in the same chip package as the other circuit components of the transceiver to provide a single chip solution. It has to be noted that the block diagrams of FIGS. 1 and 2 represent only the principal set up of an RF heterodyne transceiver. Actual implementations are, of course, much more complex. However, the illustration of FIGS. 1 and 2 is sufficient for the present discussion and the understanding of the function of the embodiments described herein.

In many applications, it may be required or desirable to measure RF power in various portions (e.g. in the receive path, in the transmit path, at the mixer reference input, etc.) of the RF frontend of an RF transceiver. As mentioned above, information about the RF power may be needed during production tests of the device to ensure compliance with product specifications and statutory regulations (quality control) as well as during regular operation of the device. To enable testability RF power sensors are provided in various portions of the RF transceiver chip. That is, the power sensors are included in the RF circuit design as a "design for testability" (DFT) feature. As mentioned, power sensors may not only be used for production tests, but also to allow power monitoring during operation of the RF frontend. For this purpose the information obtained from one or more power sensors may be provided at a dedicated terminal (e.g. output pin) of the MMIC as digital or analog signal.

For example, diodes may be used as RF power sensors. Diodes are useful for this purpose as they can be readily included in the MMIC, which includes the RF frontend. Diodes as power sensors (also referred to as power detectors) are as such known and thus not further discussed here in more detail. Generally, a diode is used to rectify an incident RF signal, wherein the diode is operated in its square-law region to generate a signal which is approximately proportional to the power of the RF signal. In order to extend the dynamic range of a diode RF power sensor beyond the square-law region, linearity correction circuits or multiple diode stacks may be used. A power sensor may be directly connected to the RF signal path, in which RF power is to be measured. Alternatively, a directional coupler or a power divider may be used to couple the power sensor to the RF signal path. Suitable directional couplers may be easily implemented using strip lines, which may be formed in a metallization layer of a MMIC.

Simple diode sensors which can be integrated together with the circuit forming the RF frontend of an RF transceiver have a limited absolute accuracy. To improve the accuracy of the power sensing, the power sensors are calibrated using a test signal, which has a defined power. The test signal may be generated on-chip by a signal generator circuit, which is also integrated in the same chip as the RF frontend. However, external test signal generators may also be used. In this case the test signal may be supplied to a test pin or a test pad (e.g. needle contact point) of the chip, e.g. using a needle probe. The test signal may have the same or a similar frequency as the RF signal (e.g. 77 GHz or 24 GHz), whose power is to be monitored during normal operation. However, this is not necessarily the case. The test signal may have a frequency which is lower than the frequency of the RF signal during operation.

Figure 3:
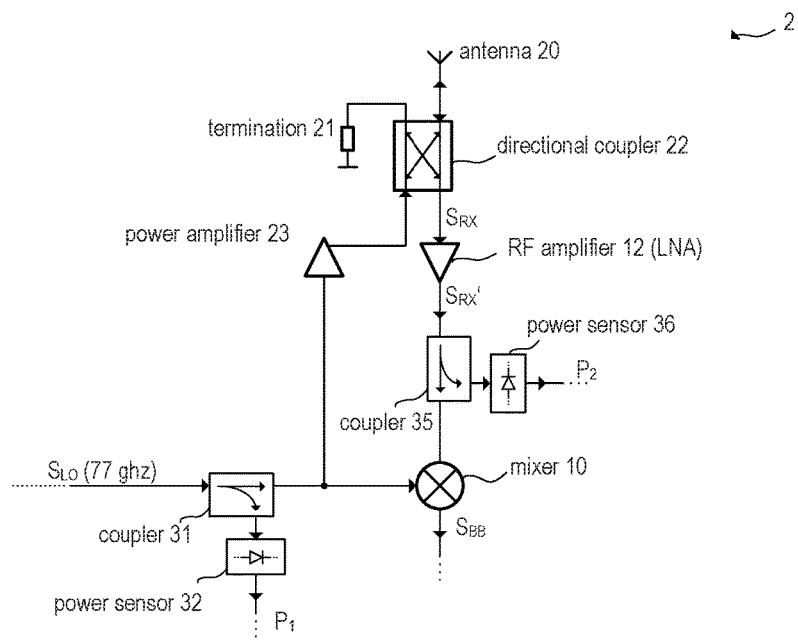
FIG. 3 illustrates the use of power sensors in an RF frontend of a radar transceiver.

FIG. 3 is a block diagram illustrating the RF frontend of the radar transceiver of FIG. 2, wherein the digital post processing part has been omitted. In addition to the example of FIG. 3, the RF frontend includes power sensors 32 and 36, which are coupled to the RF signal paths using directional couplers 31 and 35, respectively. Except for the additional power sensors and the respective couplers the circuit of FIG. 3 is identical to the circuit of FIG. 2, and reference is made to the respective description further above. Dependent on the actual implementation of the power sensors 32 and 36, the couplers 31 and 35 may be omitted and are thus optional. In this case the power sensors are directly connected to the respective RF signal paths without intervening couplers.

The level of the output signals provided by the power sensors 32 and 36 represent the current RF power level in the respective RF signal path. In the present example, the output signal $P_1$ represents the RF power of the oscillator signal at the reference input of the mixer 10. Similarly, the output signal $P_2$ represents the RF power of the amplified antenna signal incident at the RF input of the mixer 10. Additional power sensors may be included in other portions of the RF frontend. In most applications the output signals $P_1$, $P_2$ of the power sensors 32, 36 will be voltage signals, which may be digitized for further processing in the digital domain.

Figure 4:
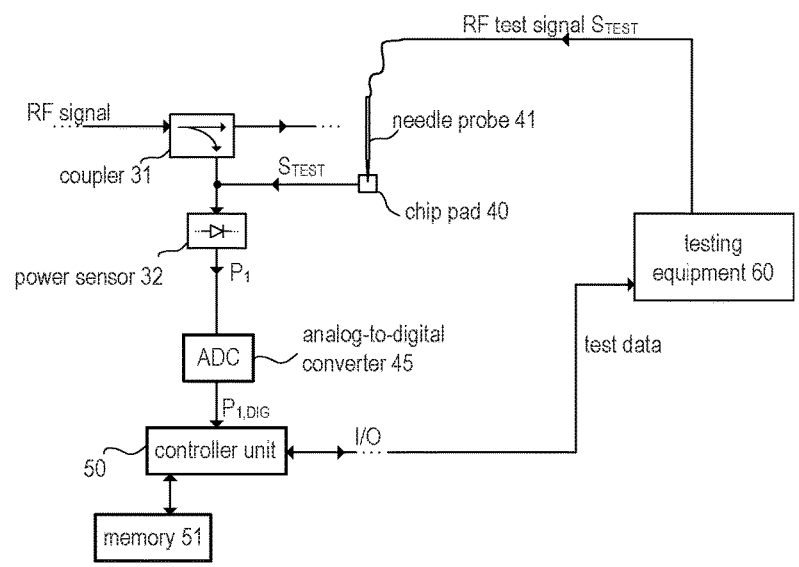
FIG. 4 shows a block diagram illustrating the calibration of a power sensor, which is integrated, e.g., in the RF frontend of FIG. 3.

FIG. 4 is a block diagram illustrating the calibration of a power sensor (e.g. power sensor 32 as illustrated in FIG. 3) using an RF test signal $S_{TEST}$ which has a defined power level. FIG. 4 illustrates directional coupler 31, coupling power sensor 32 with an RF signal path, in which RF power is to be measured. As mentioned above with reference to FIG. 3, the coupler 31 may be optional dependent on the actual implementation. For the purpose of sensor calibration the power sensor 32 is coupled with a chip pad 40, which is configured to be contacted with a needle probe 41 during a production test. Generally, the chip pad 40 is a circuit node receiving the test signal $S_{TEST}$. The needle probe 41 is used to feed an RF test signal $S_{TEST}$ into power sensor 32 via the chip pad 42, wherein the test signal $S_{TEST}$ has an RF signal power, which can be set to one or more defined levels. The test signal may be generated with external test equipment 60. Alternatively, an on-chip signal generator may be used (in this case the needle probe 41 is not needed). During calibration the power sensor 32 measures the power of the RF test signal $S_{TEST}$ and provides a respective sensor signal $P_1$ representing the instantaneous power level of the signal $S_{TEST}$. The sensor output signal $P_1$ may be digitized using an analog-to-digital converter (ADC) 45, and the resulting digital sensor signal $P_{1,DIG}$ may be provided to a controller unit 50 (which may also include the digital signal processor 15, see FIG. 1).

The controller unit 50 may be configured to communicate the digital sensor signals $P_{1,DIG}$ back to the test equipment, so that calibration parameters may be calculated dependent on the known power levels of the test signal $S_{TEST}$ and the respective sensor output signals $P_{1,DIG}$. The calibration parameters may be communicated back to the controller unit 50 and stored in a memory 51. During normal operation of the radar sensor the stored calibration parameters may be used by the controller unit 50 to correct the corresponding sensor output signals $P_1$, $P_2$ and, thus, the accuracy of the power measurement is improved.

If the information about the power level of the test signal $S_{TEST}$ is available in the controller unit 50, the calibration parameters may be calculated by the controller unit 50 instead of in the testing equipment 60. Moreover, if the test signal $S_{TEST}$ is generated on-chip the external testing equipment is not needed and calibration can be repeated regularly or in specific time intervals during the lifetime of the RF transceiver. Accordingly, drifting of the sensor characteristic of the power sensors may be compensated for by regularly updating the calibration parameters.

Figure 5:
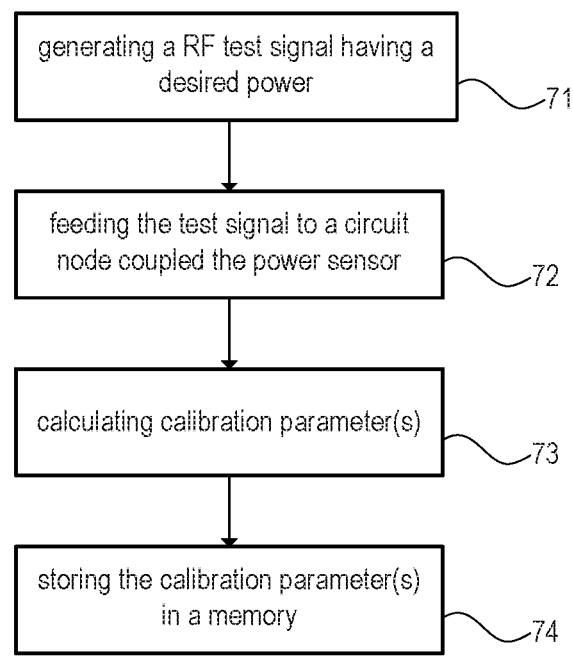
FIG. 5 shows a flow-chart illustrating an exemplary method for calibrating power sensors, which are used in an RF frontend integrated in a MMIC.

FIG. 5 shows a flow chart that illustrates one exemplary calibration method which may be accomplished using the system of FIG. 4. Accordingly, power sensors (e.g. power sensor 32 in FIG. 4) included in a MMIC are calibrated using an automatic testing equipment (e.g. testing equipment 60 in FIG. 4). In the present example a RF test signal, which has a desired power, is generated (step 71). The RF test signal is fed to a circuit node, which is coupled to at least one power sensor included in the MMIC (step 73). As a result, the power sensor provides a respective sensor signal (see FIG. 4, sensor signal $P_1$) that represents the power of the RF test signal, and at least one calibration parameter can be calculated based on the desired power and the respective sensor signal (step 73). The calibration parameter(s) may then be stored in a memory (step 74, see FIG. 4, memory 51).

While various embodiments of the invention have been described, it will be apparent to those of ordinary skill in the art that many more embodiments and implementations are possible within the scope of the invention. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

The invention claimed is:

1. A system comprising:
a monolithic microwave integrated circuit (MMIC) that includes at least one radio frequency (RF) signal path for an RF signal, at least one power sensor coupled to the RF signal path, and a circuit node for receiving an RF test signal,
wherein the at least one power sensor is configured to receive the RF test signal via the circuit node and a needle probe, and
wherein the at least one power sensor is configured to provide a sensor signal representing a power level of the RF test signal; and
an automatic testing equipment (ATE) configured to generate the RF test signal and feed the RF test signal into the circuit node,
wherein the ATE is configured to receive the sensor signal and to calculate at least one calibration parameter based on a known power level of the RF test signal and the sensor signal, and
wherein the ATE is configured to communicate the at least one calibration parameter to the MMIC.

2. The system of claim 1,
wherein the MMIC further includes a controller unit configured to communicate with the ATE.

3. The system of claim 1,
wherein the ATE is configured to receive the power level of the RF test signal, and to calculate at least one calibration parameter based on the power level of the RF test signal and the sensor signal.

4. The system of claim 1, further comprising:
a memory for storing the at least one calibration parameter.

5. The system of claim 1,
wherein the at least one calibration parameter is utilized to correct the sensor signal.

6. A method for calibrating one or more power sensors included in a monolithic microwave integrated circuit (MMIC), the method comprising:

generating a radio frequency (RF) test signal having a desired power level;

feeding the RF test signal to the one or more power sensors included in the MMIC via a circuit node and a needle probe, a power sensor, of the one or more power sensors, providing a respective sensor signal representing a power level of the RF test signal;

receiving, by an automatic test equipment (ATE), the respective sensor signal;

calculating, by the ATE, at least one calibration parameter based on the desired power level of the RF test signal and the respective sensor signal;

communicating, by the ATE, the at least one calibration parameter to the MMIC; and storing the at least one calibration parameter in a memory.

7. The method of claim 6,
wherein the RF test signal is generated by the ATE which is separate from the MMIC.

8. The method of claim 7,
wherein feeding the RF test signal to the one or more power sensors comprises:
connecting the needle probe to a chip pad of the MMIC and feeding the RF test signal to the circuit node coupled to the one or more power sensors via the needle probe and the chip pad.

9. The method of claim 7,
wherein the RF test signal is generated by an on-chip signal generator included in the MMIC.

10. The method of claim 7,
wherein the at least one calibration parameter is calculated by the ATE.

11. The method of claim 6,
wherein the memory is included in the MMIC.

12. The method of claim 6, wherein the at least one calibration parameter is utilized to correct the respective sensor signal.

* * * * *